United States Patent [19]

Choe et al.

[11] Patent Number: 5,221,432
[45] Date of Patent: Jun. 22, 1993

[54] METHOD FOR ADHESION PROMOTION OF AN ULTRA HIGH MODULUS POLYETHYLENE FIBER/EPOXY RESIN COMPOSITE

[75] Inventors: Chul R. Choe; Jyong S. Jang, both of Seoul, Rep. of Korea

[73] Assignee: Korea Institute of Science and Technology, Seoul, Rep. of Korea

[21] Appl. No.: 649,052

[22] Filed: Feb. 1, 1991

[30] Foreign Application Priority Data

Jun. 23, 1990 [KR] Rep. of Korea .................. 90-9345

[51] Int. Cl.$^5$ .......................................... H01L 21/00
[52] U.S. Cl. ................................. 156/668; 156/643; 427/307; 427/322; 427/389.9; 427/393.5; 427/387
[58] Field of Search ..................... 427/307, 322, 389.9, 427/393.5, 387; 156/643, 668

[56] References Cited

U.S. PATENT DOCUMENTS

| | | | |
|---|---|---|---|
| 4,403,012 | 9/1983 | Harpell et al. | 428/290 |
| 4,410,586 | 10/1983 | Ladizesky et al. | 427/307 |
| 4,613,535 | 9/1986 | Harpell et al. | 428/113 |
| 4,623,574 | 11/1986 | Harpell et al. | 428/113 |
| 4,637,851 | 1/1987 | Ueno et al. | 156/643 |
| 4,663,101 | 7/1987 | Kavesh et al. | 264/203 |
| 4,842,934 | 6/1989 | Cordova et al. | 427/387 |

OTHER PUBLICATIONS

D. C. Prevorsek et al., "Ballistic Armor from Extended Chain Polyethylene Fibers", Proceedings of the 33rd International SAMPE Symposium, Mar. 7-10, 1988, pp. 1685-1696.

Donold F. Adams et al., "Properties of a Polymer-Matrix Composite Incorporating Allied A-900 Polyethylene Fiber", Proceedings of the 30th National SAMPE Symposium, Mar. 19-21, 1985, pp. 280-289.

H. X. Nguyen et al., "Optimization of Polyethylene Fiber Reinforced Composites Using a Plasma Surface Treatment", Proceedings of the 33rd International SAMPE Symposium, Mar. 7-10, 1988, pp. 1721-1729.

S. L. Kaplan et al., "Gas Plasma Treatment of Spetra Fiber", Proceedings of the 33rd International SAMPE Symposium, Mar. 7-10, 1988, pp. 551-559.

I. M. Ward and N. H. Ladizesky, "High Modulus Polyethylene Fibers and Their Composites", Composite Interfaces, H. Ishida and J. L. Koenig, Ed., Elsevier Science Publishing Co., Inc., New York, 1986, pp. 37-46.

Primary Examiner—Tom Thomas
Assistant Examiner—George Goudreau
Attorney, Agent, or Firm—Oblon, Spivak, McClelland, Maier & Neustadt

[57] ABSTRACT

A method for promoting adhesion of an ultra high modulus polyethylene fiber/epoxy resin composite is proved. The method entails subjecting a fabric made from ultra high modulus polyethylene fibers to a plasma etching, applying a silane coupling agent in hydrolyzed form to the etched fabric, and impregnating the fabric with epoxy resins, followed by molding.

4 Claims, No Drawings

METHOD FOR ADHESION PROMOTION OF AN ULTRA HIGH MODULUS POLYETHYLENE FIBER/EPOXY RESIN COMPOSITE

BACKGROUND OF THE INVENTION

1. Field of the Invention

The present invention relates to a method for adhesion promotion of ultra high modulus a composite consisting of polyethylene (UHMPE) fibers and epoxy resins. More particularly, the present invention relates to a process for promoting adhesion of a UHMPE fiber/epoxy resin composite.

2. Description of the Prior Art

Ultra high modulus polyethylene fibers have various utilities for the superior physical properties thereof. For example, ultra high modulus polyethylene fibers have a specific strength two times higher than that of aramid fibers; thus, they can be preferably used in the case where a high strength is required while using a small quantity. Further, the fibers have been used in the field of marine industry due to their high resistance to ultraviolet ray and salt [see, U.S. Pat. No. 4,663,101 ]. Moreover composite containing high modulus fibers has such a superior elasticity and energy absorption that no crack is happened even under overload, as well as good breaking strength [see, 33rd International SAMPE Symposium, p. 1685, 1988; and 30th National SAMPE Symposium, p. 280, 1985]. Thus, these fibers have wide range of utility beginning from various kinds of spring and ending to high pressure container, bullet proof jacket and building armature [see, U.S. Pat. Nos. 4,402,012, 4,623,574 and 4,613,535]. However, it has been reported that ultra high modulus polyethylene fiber/epoxy matrix resin composites suffer from a relatively low mechanical property, that is, delamination due to poor adhesion between the fiber and the matrix resin [see, 33rd International SAMPE Symposium, p. 721, 1988].

As an approach to overcome the above disadvantage, several methods have been proposed. In accordance with one of these approaches, the adhesion of the fiber and the matrix resin is enhanced by subjecting the surface of the fiber to a cold plasma etching treatment [see, 33rd International SAMPE Symposium, p. 551, 1988]. However, these methods suffer from the disadvantages that the functional groups on the modified surface of the fiber are deteriorated rapidly with the lapse of time; their reactivity with the matrix resin become lowered accordingly.

Another approach was the chemical treatment where the surface of ultra high modulus fibers is modified by a chromic acid solution of strong oxidizer [see, Composite Interfaces, p. 37, 1986]. However, this method may render the strength of the fiber degraded by the chromic acid used, and the wast liquid from this method may result in the environmental pollution.

SUMMARY OF THE INVENTION

The primary object of the invention is to provide a new method for preventing delamination in a composite consisting of ultra high modulus polyethylene fibers and epoxy resins.

Another object of the invention is to provide a new method for improving adhesion of the same composite by means of enhancement of the reactivity between the ultra high modulus polyethylene fibers and the epoxy resins.

These and other objects of the invention can be achieved by the method according to the present invention which comprises subjecting a fabric made from ultra high modulus polyethylene fibers to plasma etching; applying a silane coupling agent onto the etched fabric; and then impregnating the fabric with epoxy resins.

The surface of the ultra high modulus polyethylene fiber. can be modified by means of the cold plasma etching treatment The functional groups on the surface can be blocked by applying a silane coupling agent onto the surface thus modified.

DETAILED DESCRIPTION OF THE INVENTION

The silane coupling agent forms a intermediate layer between the ultra high modules polyethylene fibers and the epoxy resins, which not only improves the reactivity of the fibers and the resins, but also protects the surface of the fibers after etching. Hydroxy and/or amino groups of the silane coupling agent form a covalent linkage with epoxy groups of the epoxy resins, while forming another covalent linkage and hydrogen linkage with carboxyl and hydroxy groups on the surface of the ultra high modulus polyethylene fibers.

The silane coupling agent useful in the method of the invention include:

γ-methacryloxypropyltrimethoxysilane (γ-MPS) of Formula

$CH_2=C(CH_3)COO(CH_2)_3Si(OCH_3)_3$;

γ-aminopropyltriethoxysilane (γ-APS) of the Formula

$H_2NCH_2CH_2CH_2Si(OC_2H_5)_3$;

Vinyltriacetoxysilane (VTS) of Formula

$CH_2=CHSi(OOC-CH_3)_3$; and 3-(N-styrylmethyl-2-aminoethylamino)propyltrimethoxysilane (SAPS) of Formula

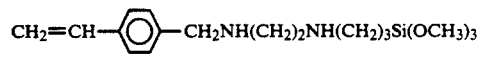

The plasma etching system is not critical in the method of the present invention. However, a plasma polymerization system Model PD-2 (SAMCO, Japan) can preferably be used in the invention. This system preferably operates at a power of 100 watt and under an oxygen atmosphere.

The ultra high modulus fiber is not critical in the method of the present invention. However, SPECTRA 900 sold by The Allied signal Corporation (U.S.A.) can preferably be used in the invention.

According to the invention, a fabric made from ultra high modulus polyethylene fibers is treated by a Soxhlet apparatus in the presence of a solvent to remove impurities, and the fabric is then dried in a vacuum of 1 to 20 mm Hg. n-Butanol can be used as the extracting solvent.

The above treated polyethylene fabric is placed in a plasma etching system using oxygen as a carrier gas to conduct etching of both surfaces of the fabric. The carrier gas may be introduced at speed ranging 10 to 200 cc per min. The etching system operates at a power of 20 to 250 watt and the etching is usually conducted for 1 to 30 minutes.

Then, the etched polyethylene fabric is coated with a silane coupling agent, followed by drying. The silane coupling agent is used at a concentration of 0.05 to 10% by weight after subjecting the same to hydrolysis in the presence of a solvent. A mixed solution of n-butanol/water (W/W 95:5) can be used as such a solvent.

The above coated polyethylene fabric is impregnated with an epoxy resin and then cured in the presence of a curing agent. Any of commercially available epoxy resin can be used in the method of the invention. However, EPON 828 which is a bisphenol epichlorohydrin type of di-functional epoxy resin sold by The Shell Company (U.S.A.) is preferred. Tetraethylenetriamine can be used as a curing agent.

A number of the polyethylene fabric thus treated is layed up and molded in a blanket press mold to form a composite. The molding pressure and temperature are 3 to 15 atm. and 80 to 130° C., respectively.

DESCRIPTION OF THE PREFERRED EMBODIMENT

The invention will be illustrated in greater detail by way of the following examples. The examples are presented for illustrative purpose only and should not be construed as limiting the invention which is properly delineated in the claims.

EXAMPLE 1

A fabric (15 cm×15 cm in size) was prepared from ultra high modulus polyethylene fibers. The fabric was extracted for 4 hrs. in a Soxhlet apparatus using n-butanol as a solvent to remove impurities on its surface and dried in a vacuum of 5 mmHg at 25° for 12 hrs. The dried fabric was placed in plasma etching apparatus using oxygen as a carrier gas and operating at a power of 100 watts to undergo etching for 5 min.

γ-APS was hydrolyzed in a mixed solvent of n-butanol/water (95:5 W/W) at a pH of 3.5 for an hour to give a hydrolyzed silane coupling agent, which was applied onto the above etched fabric after diluting the coupling agent to a concentration of 0.2% by weight.

The above treated fabric was subjected to impregnation with EPON 828, an epoxy resin, to produce a prepreg. At this moment, tetraethylenetetraamine was used in an amount of 13 g per 100 g of the epoxy resin as a curing agent.

Six sheets of the prepregs thus obtained (fiber volume ratio: 60%) were layed up and molded in a blanket press mold at 110° under 3.5 atm. for 4 hours to give a composite.

The adhesion of the composite thus obtained was evaluated by measuring the interlaminar shear strength of the same in accordance with the testing method of ASTM D 2344. The specimen used in this test was 10 mm in width and 15 mm in gauge length. The increasement in adhesion was presented with relative values regarding the interlaminar shear strength of the untreated polyethylene fabric as a value of 100. The result of the evaluation is shown in Table 1 below.

EXAMPLES 2-4

The same procedure as in Example 1 was repeated, except that VTS (Example 2), SAPS (Example 3) and γ-MPS (Example 4) were used as the silane coupling agent in place of γ-APS. The results shown in Table 1 below were obtained.

TABLE 1

| Ex. No. | Silane Coupling Agent | Interlaminar Shear Strength (MPa) | Increasement in Adhesion (%) |
|---|---|---|---|
| 1 | γ-APS | 27.30 | 257 |
| 2 | VTS | 27.68 | 260 |
| 3 | SAPS | 28.51 | 268 |
| 4 | γ-MPS | 26.82 | 252 |

COMPARATIVE EXAMPLES 1-4

The same procedure as in Example 1 was repeated, except that after moving impurities, γ-APS (Comparative Example 1), VTS (Comparative Example 2), SAPS (Comparative Example 3) and γ-MPS (Comparative Example 4) were applied to a polyethylene fabric without undergoing a cold plasma etching treatment. The results are shown in Table 2 below.

TABLE 2

| Ex. No. | Silane Coupling Agent | Interlaminar Shear Strength (MPa) | Increasement in Adhesion (%) |
|---|---|---|---|
| 1 | γ-APS | 13.32 | 125 |
| 2 | VTS | 14.16 | 133 |
| 3 | SAPS | 14.32 | 135 |
| 4 | γ-MPS | 13.27 | 125 |

COMPARATIVE EXAMPLE 5

The same procedure as in Example 1 was repeated, except that an application of epoxy resins were conducted after a cold plasma etching treatment of a polyethylene fabric without coating the fabric with silane coupling agents. The result is shown in Table 3 below.

TABLE 3

| Comp. Ex. No. | Interlaminar Shear Strength (MPa) | Increasement in Adhesion (%) |
|---|---|---|
| 5 | 25.39 | 238 |

What is claimed is:

1. A method for promoting adhesion of an ultra high modulus polyethylene fiber/epoxy resin composite, which comprises subjecting a fabric made from ultra high modulus polyethylene fibers to plasma etching; applying a silane coupling agent in hydrolyzed form onto the etched fabric; and then impregnating the fabric with epoxy resins.

2. The method of claim 1, wherein the silane coupling agent is selected from the group consisting of γ-methacryloxypropyltrimethoxysilane, γ-aminopropyltriethoxysilane, vinylacetoxysilane and 3-(N-styrylmethyl-2-aminoethylamino)propyltrimethoxysilane.

3. The method of claim 1, the silane coupling agent is used at a concentration ranging 0.05 to 10% by weight.

4. The method of claim 1, wherein the plasma etching treatment is conducted at a power of 100 watts for a period of 1.0 to 10.0 min.

* * * * *